United States Patent
Kajale et al.

(10) Patent No.: US 10,800,300 B2
(45) Date of Patent: Oct. 13, 2020

(54) FASTENER AND FASTENED SEAT ASSEMBLY

(71) Applicant: Lear Corporation, Southfield, MI (US)

(72) Inventors: Vikrant Kajale, Oberding (DE); Kevin Farley, Coventry (GB); Wayne Meyrick, Nuneaton (GB); Darren Legh, West Midlands (GB); Paul Jones, Coventry (GB); Stefan Gottauf, Oberding (DE)

(73) Assignee: Lear Corporation, Southfield, MI (US)

( * ) Notice: Subject to any disclaimer, the term of this patent is extended or adjusted under 35 U.S.C. 154(b) by 121 days.

(21) Appl. No.: 15/926,342

(22) Filed: Mar. 20, 2018

(65) Prior Publication Data

US 2019/0291615 A1    Sep. 26, 2019

(51) Int. Cl.
   *B60N 2/58*     (2006.01)
   *A44B 99/00*    (2010.01)
   *B60N 2/90*     (2018.01)
   *B60N 2/68*     (2006.01)

(52) U.S. Cl.
   CPC ............ *B60N 2/5825* (2013.01); *A44B 99/00* (2013.01); *B60N 2/90* (2018.02); *A44D 2211/00* (2013.01); *B60N 2/68* (2013.01)

(58) Field of Classification Search
   CPC .......... B60N 2/5825; B60N 2/90; B60N 2/68; A44D 2211/00; A44B 99/00
   USPC ..... 297/452.18, 411.23, 410; 403/109.1, 345
   See application file for complete search history.

(56) References Cited

U.S. PATENT DOCUMENTS

| | | | | |
|---|---|---|---|---|
| 2,045,225 A | * | 6/1936 | Glasgow | A47C 1/10 297/408 |
| 2,204,861 A | * | 6/1940 | Knapp | H01Q 1/103 52/110 |
| 3,695,702 A | * | 10/1972 | Ingellis | A47C 4/02 297/440.24 |
| 4,415,061 A | * | 11/1983 | Meyer | A63B 27/00 182/92 |
| 5,440,315 A | * | 8/1995 | Wright | H01Q 1/084 343/702 |
| 5,713,591 A | * | 2/1998 | Zarkhin | A61G 5/12 248/118.3 |
| 5,769,496 A | * | 6/1998 | Gryp | A47C 1/03 297/411.32 |

(Continued)

FOREIGN PATENT DOCUMENTS

CN    206568936 U    10/2017
FR     3014784 B1     4/2017

*Primary Examiner* — Milton Nelson, Jr.
(74) *Attorney, Agent, or Firm* — Brooks Kushman P.C.

(57) ABSTRACT

A fastener is provided with a shank that is sized to engage apertures formed in at least two components. A retainer extends laterally from the shank for engagement within another aperture formed in one of the at least two components to retain the shank from lengthwise translation relative to the apertures in the at least two components. The shank has a plurality of varying concentric diameters for engagement within a plurality of apertures formed in the at least two components. A receptacle is formed in a structural component, sized to receive the fastener. A retainer extends laterally from the shank for engagement within another aperture formed in one of the at least two components to retain the shank from lengthwise translation relative to the apertures in the at least two components.

16 Claims, 4 Drawing Sheets

(56) References Cited

U.S. PATENT DOCUMENTS

| | | | | |
|---|---|---|---|---|
| 5,947,428 A | * | 9/1999 | Ohl | A47C 27/085 |
| | | | | 248/118 |
| 5,988,757 A | | 11/1999 | Vishey et al. | |
| 6,352,385 B1 | * | 3/2002 | Wojciechowski | F16D 1/033 |
| | | | | 403/364 |
| 6,511,126 B1 | * | 1/2003 | McAdams | A47C 1/143 |
| | | | | 297/217.1 |
| 7,579,993 B2 | * | 8/2009 | Lev | H01Q 1/084 |
| | | | | 343/702 |
| 2005/0179299 A1 | * | 8/2005 | Yetukuri | B60N 2/80 |
| | | | | 297/391 |
| 2007/0001502 A1 | * | 1/2007 | Welsh | A47C 7/52 |
| | | | | 297/423.4 |
| 2016/0311353 A1 | | 10/2016 | Yasuda et al. | |

* cited by examiner

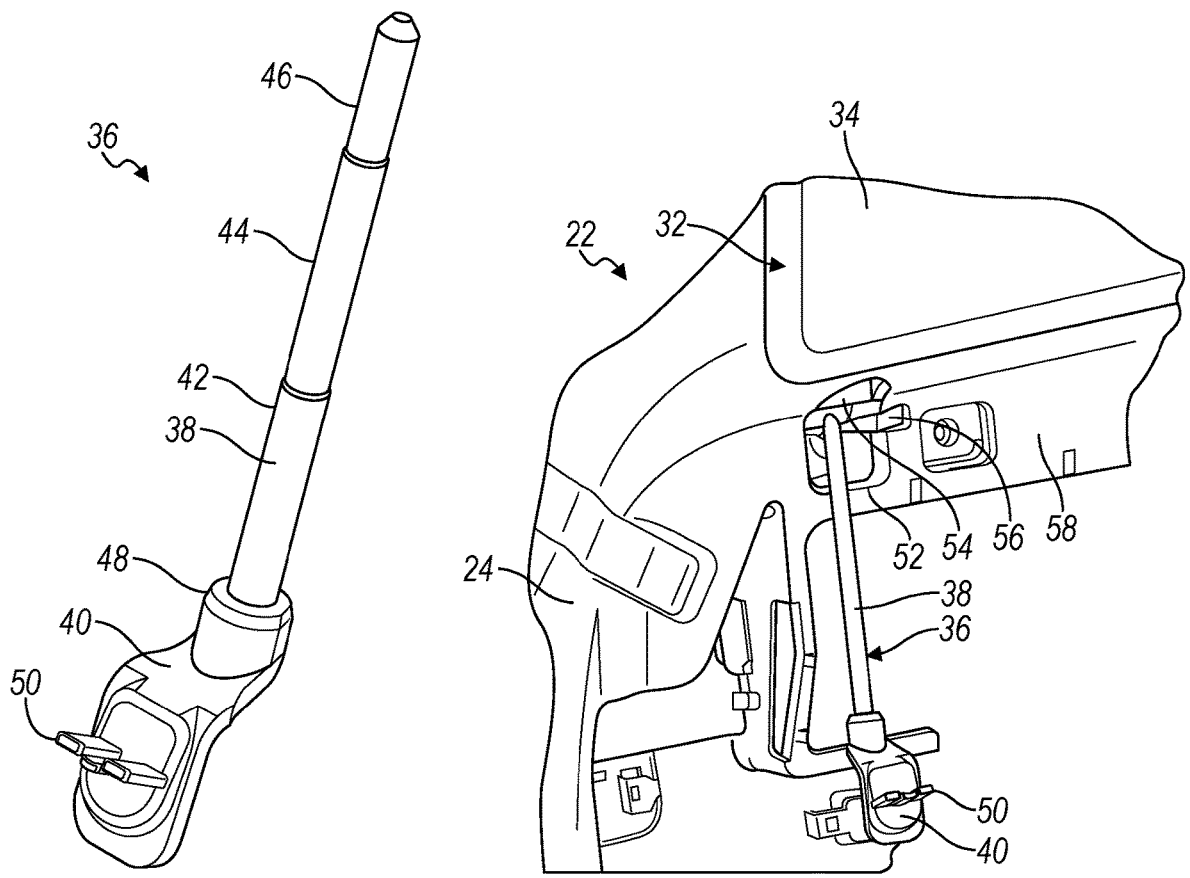
FIG. 3
FIG. 4
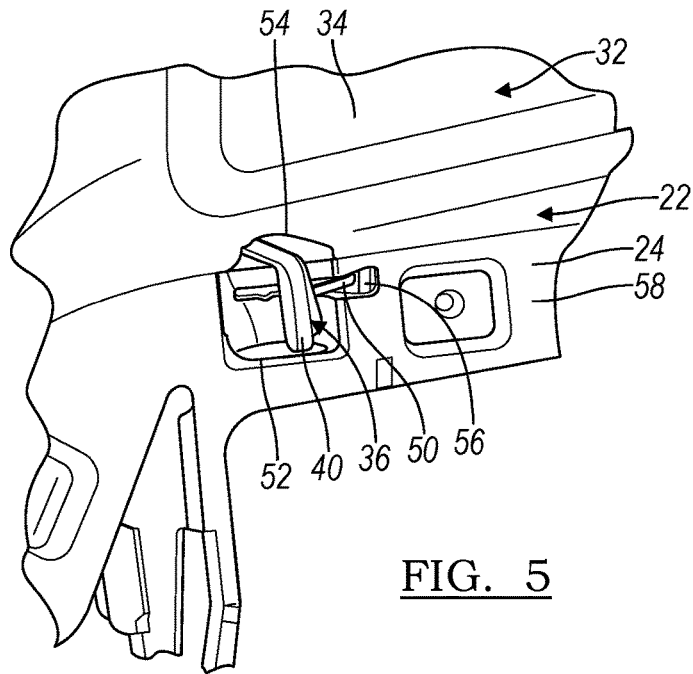
FIG. 5

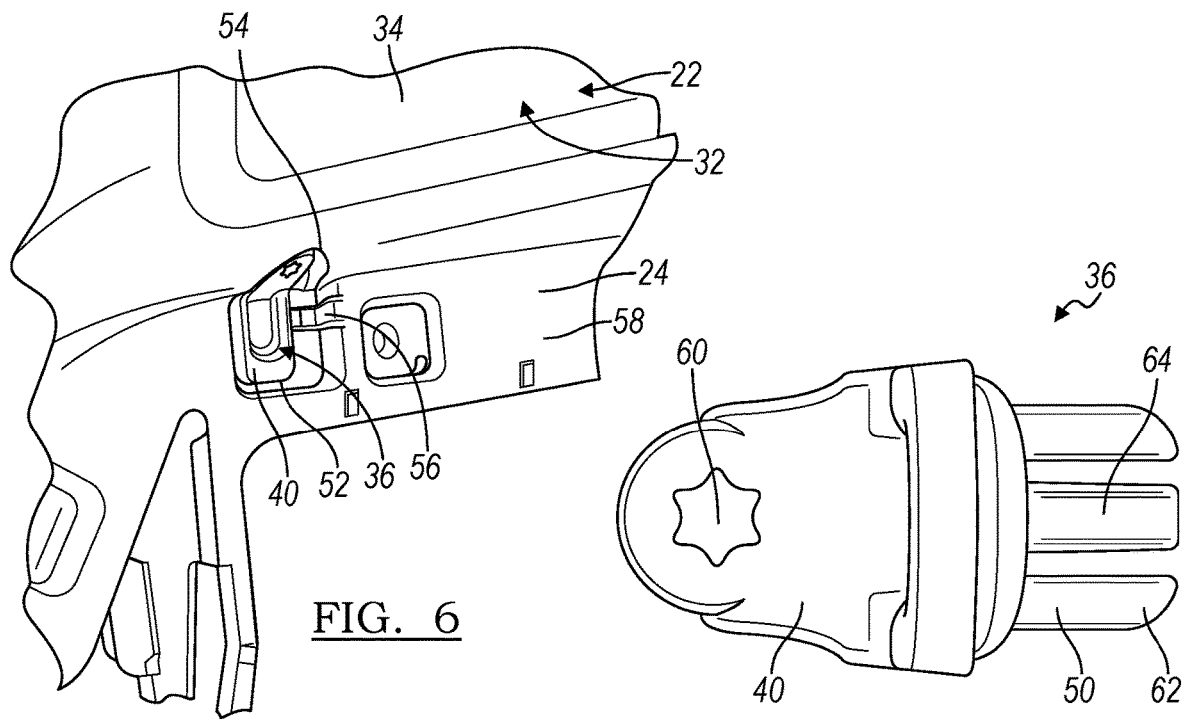
FIG. 6
FIG. 7
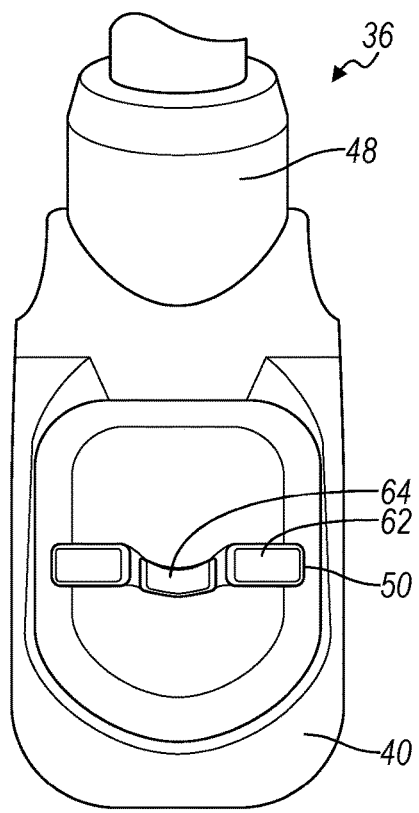
FIG. 8
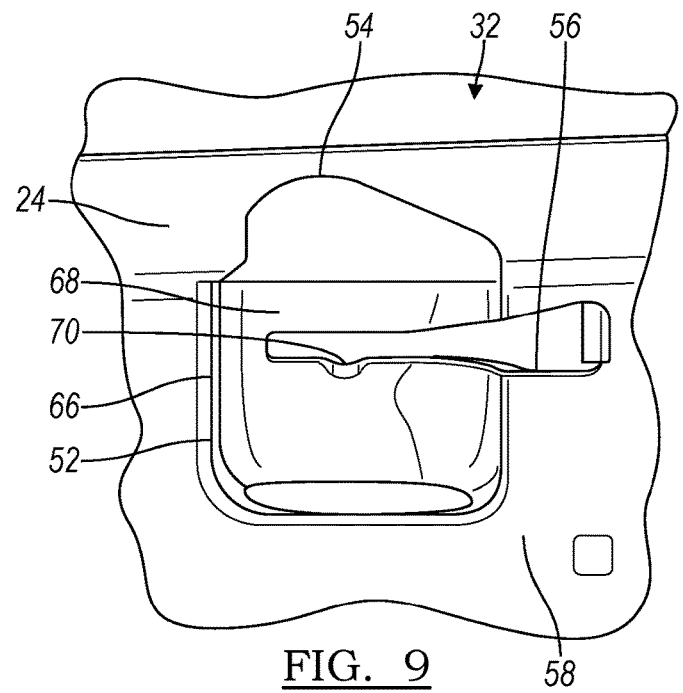
FIG. 9

FASTENER AND FASTENED SEAT ASSEMBLY

TECHNICAL FIELD

Various embodiments relate to fasteners and seat assemblies that utilize fasteners.

BACKGROUND

A vehicle seat assembly and its underlying structural components and connections are disclosed in U.S. Pat. No. 5,988,757, which issued to Lear Corporation on Nov. 23, 1999.

SUMMARY

According to at least one embodiment, a fastener is provided with a shank that is sized to engage apertures formed in at least two components. A retainer extends laterally from the shank for engagement within another aperture formed in one of the at least two components to retain the shank from lengthwise translation relative to the apertures in the at least two components.

According to a further embodiment, the shank has a plurality of varying concentric diameters for engagement within a plurality of apertures formed in the at least two components.

According to an even further embodiment, a largest of the plurality of varying concentric diameters is oriented adjacent to the retainer.

According to another further embodiment, the shank has a first cylindrical portion, and a second cylindrical portion with a diameter that is different than and generally concentric with a diameter of the first cylindrical portion.

According to another further embodiment, the retainer comprises an alignment feature to assist manual installation.

According to another further embodiment, a head is formed on a distal end of the shank, wherein the retainer extends from the head.

According to an even further embodiment, the shank is formed from a metal alloy; and the head is formed from a polymeric material.

According to another even further embodiment, a drive socket is formed in the head and sized to receive a drive tool to rotate the head and the shank.

According to another embodiment, an assembly is provided with a structural component with a receptacle sized to receive a fastener with a shank that is sized to engage apertures formed in at least two components. A retainer extends laterally from the shank for engagement within another aperture formed in one of the at least two components to retain the shank from lengthwise translation relative to the apertures in the at least two components.

According to a further embodiment, a second component is mounted to the structural component with an aperture aligned with the receptacle to receive the shank.

According to an even further embodiment, the structural component is defined as a first seat assembly component. The second component is defined as a second seat assembly component.

According to yet an even further embodiment, the first seat assembly component is defined as a seat substrate. The second seat assembly component is defined as a seat trim component.

According to another embodiment, a structural component is provided with a receptacle sized to receive a head of a fastener such that a shank of the fastener extends through the receptacle. A retainer of the fastener that extends laterally from the shank is received in the receptacle to retain the shank from lengthwise translation.

According to a further embodiment, the receptacle has an opening facing a direction generally perpendicular to the shank.

According to an even further embodiment, the receptacle defines a sidewall with a slot formed laterally therein and sized to receive the retainer.

According to yet an even further embodiment, the slot has an initial width adjacent the opening, and a narrower width spaced apart from the opening.

According to an even further embodiment, the slot has a blind depth to limit rotation of the fastener.

According to another even further embodiment, the structural component has an outward surface adjacent the receptacle opening and the slot extends through the outward surface.

According to another even further embodiment, a detent is formed in the slot. The retainer is provided with a projection sized to be received in the detent to orient the fastener at an installed orientation.

According to another embodiment, a method for assembling components provides a first component with at least one aperture. A second component is provided with a receptacle. The at least one aperture of the first component is aligned with the receptacle of the second component. A shank of a fastener is installed through the receptacle of the second component into the at least one aperture of the first component. The fastener is rotated so that a lateral retainer of the fastener engages the second component to prevent translation of the fastener relative to the first and second components.

BRIEF DESCRIPTION OF THE DRAWINGS

FIG. 3 is a front perspective view of a fastener according to an embodiment, and of the seat assembly of FIG. 1 according to another embodiment;

FIG. 4 is an enlarged partial rear perspective view of the seat assembly of FIG. 1, illustrated partially disassembled and during a step of an assembly method according to an embodiment;

FIG. 5 is another enlarged partial rear perspective view of the seat assembly of FIG. 1, illustrated partially disassembled and during another step of the assembly method;

FIG. 6 is another enlarged partial rear perspective view of the seat assembly of FIG. 1, illustrated partially disassembled and during another step of the assembly method FIG. 7 is a bottom end view of the fastener of FIG. 3;

FIG. 8 is a partial front elevation view of a bottom end of the fastener of FIG. 3;

FIG. 9 is a partial rear elevation view of a receptacle formed in a component of the seat assembly of FIG. 1;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
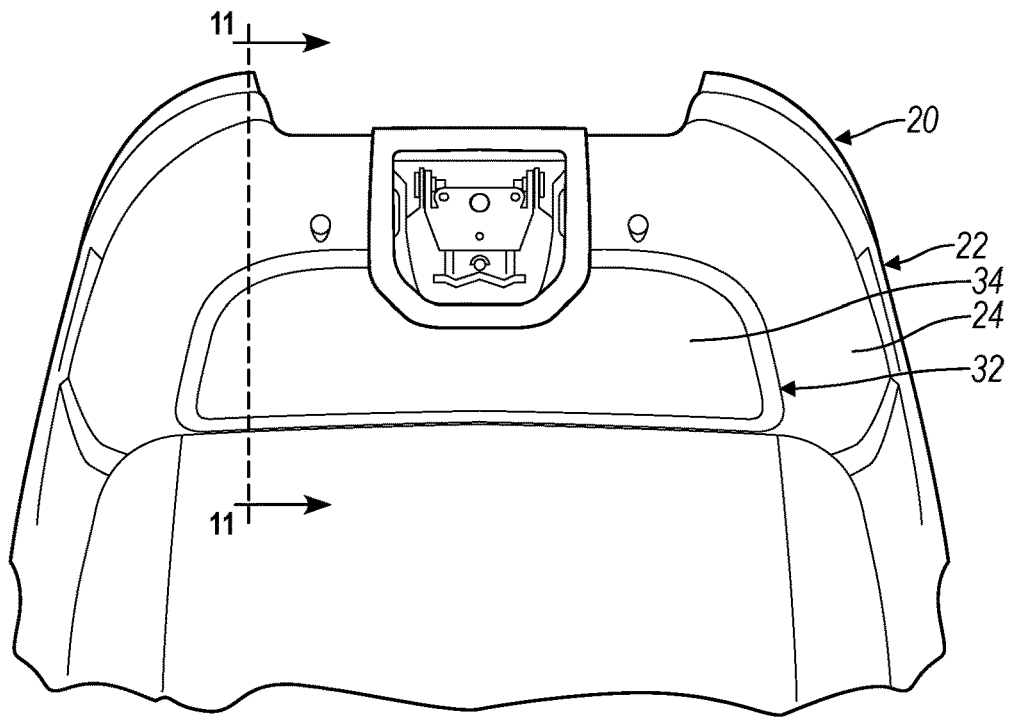
FIG. 1 is a rear perspective view of a seat assembly according to an embodiment.

FIG. 1 illustrates a seat assembly 20 according to an embodiment. The seat assembly 20 is illustrated as a vehicle seat assembly 20, which may be employed in a land vehicle, aircraft or sea craft. The seat assembly 20 is illustrated as an example of a fastened assembly, which employs a fastener and a method of fastening according to various embodiments. However, the various embodiments contemplate any seat assembly, such as an office chair or the like. Additionally, various embodiments contemplate any fastened vehicle interior assembly, such as screens on headrests for rear seat entertainment, valances, backboards, map pockets and the like.

Figure 2:
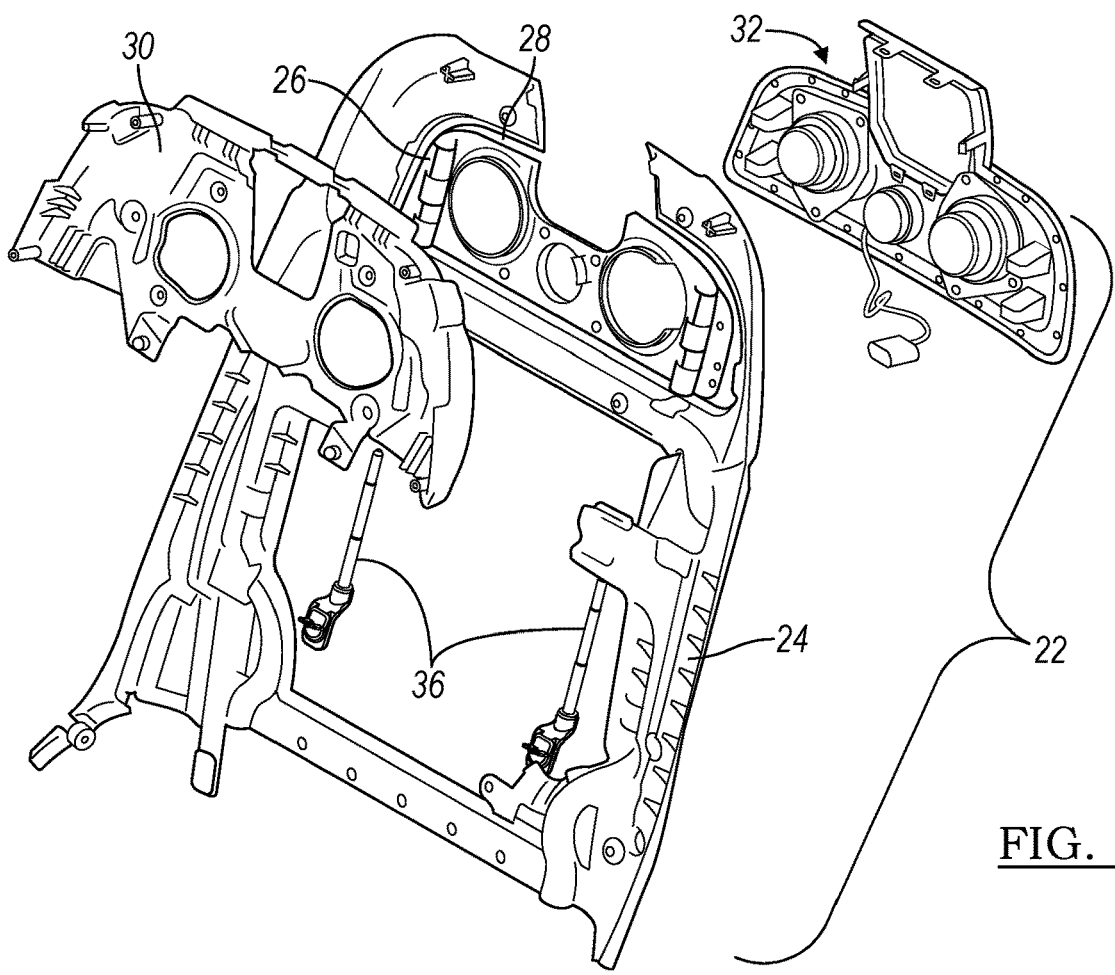
FIG. 2 is a front exploded perspective view of components of the seat assembly of FIG. 1.

The seat assembly 20 includes a seat back 22, which is a fastened assembly, wherein multiple components are fastened together within a compact space. FIG. 2 illustrates components of the seat back 22 during assembly. The seat back 22 includes a seat back moulding, 24 which is a structural substrate to fasten directly to a seat back frame (not shown). The seat back 22 also includes an audio carrier 26 that is aligned within an opening 28 in the seat back moulding 24 for assembly. A seat frame mounting carrier 30 is assembled to a front of the audio carrier 26 and the seat back moulding 24. An audio system module 32 is also aligned with the seat back moulding 24 and the audio carrier 26, and assembled to a rear surface of the seat back moulding 24 and the audio carrier 26 for assembly with the seat back moulding 24, the audio carrier 26, and the seat frame mounting carrier 30. The audio system module 32 may include a decorative trim member 34 on an external surface as illustrated in FIG. 1.

The seat back moulding 24, the audio carrier 26, the seat frame mounting carrier 30, and the audio system module 32 are collectively assembled together by a pair of fasteners 36. One of the fasteners 36 is illustrated in greater detail in FIG. 3. The fastener 36 includes a linear shank 38 extending from a head 40.

The shank 38 is sized to engage apertures within each of the assembled components. The shank 38 includes a plurality of cylindrical portions 42, 44, 46 with varying concentric diameters for engagement within the apertures in the assembled components. The diameters of the cylindrical portions 42, 44, 46 decrease away from the fastener head 40 so that the corresponding apertures provide clearance for the initial portion 46 and the intermediate portion 44 as they pass through to the corresponding aperture. The shank 38 is not threaded. The cylindrical portions 42, 44, 46 of the shank 38 are smooth and cylindrical with a consistent cross section to each provide a locating pin to accurately engage the corresponding aperture. The cylindrical portions 42, 44, 46 of the shank 38 are each oversized relative to the corresponding aperture to provide a press fit or an interference fit engagement. Although three cylindrical portions 42, 44, 46 are illustrated and described, any number of cylindrical portions 42, 44, 46 are contemplated to assembly any number of components. The shank 38 may be formed integrally from a single hardened metallic alloy, or any suitable material.

Various manufacturing techniques create high demands on flexibility and modularity of assembly processes. For example, just-in-time (JIT) manufacturing may require that the components of the seat back 22 are assembled separate from the frame; and may include diverse options, such as with and without audio equipment. The fastener 36 provides an efficient and effective retention system thereby minimizing manufacturing time, effort and costs. Since the shank 38 is unthreaded, no tool is required for locking or unlocking the fastener 36.

The head 40 of the fastener 36 may be formed integrally with the shank 38. According to the depicted embodiment, the head 40 is formed from a polymeric material that is overmolded upon the shank 38. The head 40 may include a boss 48 which may provide a fourth cylindrical diameter portion for alignment along the fastener 36. The head 40 includes a contour to match an external surface of the associated seat back moulding 24 of the seat assembly 20. A lateral retainer 50 extends from the head 40, and generally angled away from the shank 38 to engage one of the seat components and retain the shank 38 within the associated apertures. Once assembled, the retainer 50 prevents the shank 38 from lengthwise translation and consequently disassembly of the seat components.

Referring again to FIG. 2, the seat back 22 is assembled by aligning the seat back moulding 24, the audio carrier 26, the seat frame mounting carrier 30 and the audio system module 32 such that the apertures of these components 24, 26, 30, 32 are aligned. Referring now to FIG. 4, the seat back moulding 24 includes a pair of receptacles 52, each sized to retain a head 40 of one of the fasteners 36. The receptacles 52 each include an upper aperture 54 that is aligned with the apertures of the seat components 24, 26, 30, 32. The fastener 36 distal end is inserted into the receptacle 52, and then into the upper aperture 54. The fastener 36 is translated from FIG. 4 to FIG. 5 so that the shank 38 engages the apertures in the seat components 24, 26, 30, 32.

In FIG. 5, the retainer 50 is aligned with a slot 56 formed through an outward surface 58 of the seat back moulding 24. Then in FIG. 6, the fastener 36 is rotated approximately a quarter turn, or ninety degrees, thereby engaging the retainer 50 within the slot 56. The fastener 36 provides multiple axes of alignment for the multiple components 24, 26, 30, 32. The fastening operation is repeatable and efficient for flexible end-of-the line assembly. The fastening operation also permits simplified serviceability for service, maintenance or disassembly of the seat assembly 20.

FIGS. 7 and 8 illustrate the head 40 in greater detail. The head 40 may include a drive socket 60 for rotation of the fastener 36 by a tool. However, it is contemplated that the fastener may be rotated manually by hand. The tool may only be needed for removal of the fastener 36, automating the assembly process, or the like.

The retainer 50 includes a pair of outboard extensions 62 and a central detent 64. The outboard extensions 62 have a constant thickness in a direction that is parallel with the shank 38. The detent 64 extends beyond the thickness of the extensions to act as a clip and provide an alignment feature to assist manual installation.

Referring now to FIG. 9, the receptacle 52 is illustrated enlarged without the fastener 36. The receptacle 52 includes an opening 66 facing away from the aperture 54 and the shank 38. The slot 56 is formed through a sidewall 68 in the receptacle 52. The slot 56 is formed laterally through the sidewall 68 and also extends through the outward surface 58. The slot 56 has an initial width that is sized greater than an overall thickness of the extensions 62 and the detent 64 to facilitate receipt of the retainer 50. The slot 56 has a blind depth to permit ninety degrees or a quarter turn of the fastener 36, and to locate the retainer 50 at a fully installed position. The width of the slot 56 narrows toward the depth to a width corresponding to the extensions 62. The slot 56 also includes a detent 70 corresponding to the detent 64 of the fastener 36 to receive the detent 64 and clip the retainer 50 upon installation.

The fastener 36 with the retainer 50 permits simplified serviceability for maintenance and reworking of the seat assembly 20. The retainer 50 with the detent 64 provides anti-rotation of the fastener 36. The detent 64 also loads the connection to avoid noises, such as buzz, squeak and rattle in the seat assembly 20. By eliminating threading from the shank 38, minimal deformation or stress concentration is applied upon the fastened components 24, 26, 30, 32. The retainer 50 requires rotation to uninstall; however, the fastener 36 is not subjected to rotational loads under ordinary seating applications. By replacing multiple fasteners with the pair of fasteners 36, a potential component cost and weight is reduced.

Figure 10:
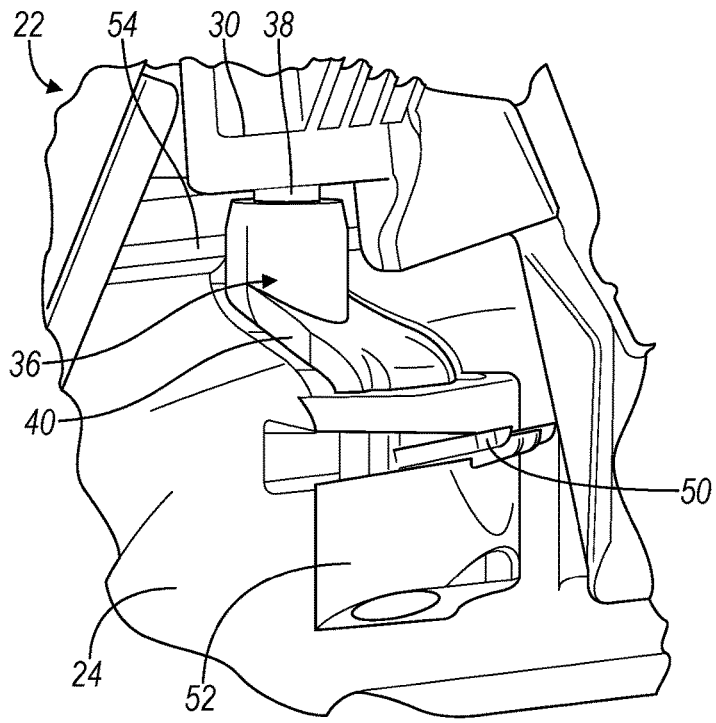
FIG. 10 is an enlarged partial front perspective view of the seat assembly of FIG. 1, illustrated partially disassembled to illustrate a portion of the fastener of FIG. 3.
Figure 11:
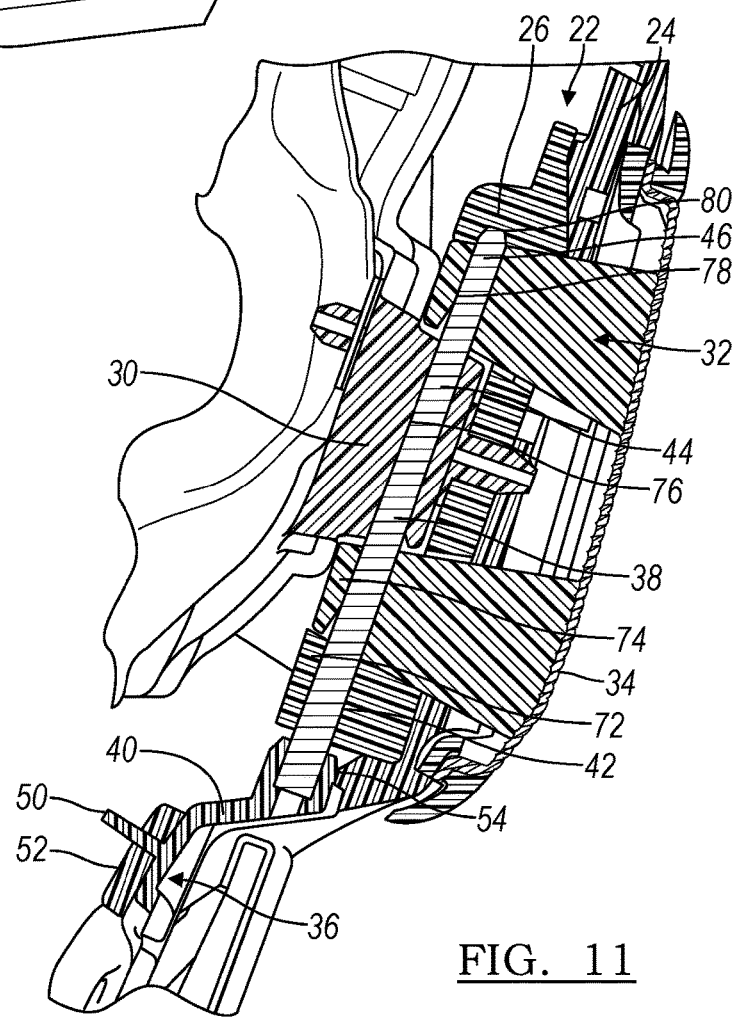
FIG. 11 is an enlarged partial side section view of the seat assembly of FIG. 1 taken along section line 11-11 in FIG. 1.

FIG. 10 illustrates the retainer 50 fully installed in the slot 56. FIG. 11 illustrates a cross section of the seat assembly 20 to reveal the fastener 36 installed into the plastic components 24, 26, 30, 32. The head 40 of the fastener 36 may be contoured to sit flush with the seat back moulding 24. Likewise, the boss 48 engages the receptacle aperture 54 in the receptacle 52 in the seat back moulding 24. The first diameter portion 42 of the shank 38 engages an aperture 72 in the audio carrier 26 and an aperture 74 in the audio system module 32. The second diameter portion 44 of the shank 38 engages an aperture 76 in the seat frame mounting carrier 30. The third diameter portion 46 engages another aperture 78 in the audio system module 32 and an aperture 80 in the audio carrier 26.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fastener comprising:
   a shank sized to engage apertures formed in at least two components; and
   a retainer extending laterally from the shank sized to be received within another aperture formed in one of the at least two components to retain the shank from lengthwise translation relative to the apertures in the at least two components;
   wherein the retainer comprises an alignment feature with a detent to assist manual installation;
   wherein the shank is not threaded;
   wherein the retainer further comprises a pair of outboard extensions with the detent oriented therebetween;
   wherein the pair of outboard extensions has a constant thickness in a direction that is parallel with the shank; and
   wherein the detent extends beyond the thickness of the pair of outboard extensions.

2. The fastener of claim 1 wherein the shank has a plurality of varying concentric diameters sized to be received within a plurality of apertures formed in the at least two components.

3. The fastener of claim 2 wherein a largest of the plurality of varying concentric diameters is oriented adjacent to the retainer.

4. The fastener of claim 1 wherein the shank has a first cylindrical portion, and a second cylindrical portion with a diameter that is different than and generally concentric with a diameter of the first cylindrical portion.

5. The fastener of claim 4 wherein the shank has a third cylindrical portion with a diameter that is different than and generally concentric with the diameters of the first cylindrical portion and the second cylindrical portion.

6. The fastener of claim 1 further comprising a head formed on a distal end of the shank, wherein the retainer extends from the head.

7. The fastener of claim 6 wherein the shank is formed from a metal alloy; and
   wherein the head is formed from a polymeric material.

8. The fastener of claim 6 wherein a drive socket is formed in the head and sized to receive a drive tool to rotate the head and the shank.

9. The fastener of claim 6 wherein the head comprises a boss with a cylindrical diameter portion for alignment along the fastener.

10. An assembly comprising a structural component with a receptacle sized to receive a fastener according to claim 1.

11. The assembly of claim 10 further comprising a second component mounted to the structural component with an aperture aligned with the receptacle to receive the shank.

12. The assembly of claim 11 wherein the structural component comprises a first seat assembly component; and
    wherein the second component comprises a second seat assembly component.

13. The assembly of claim 12 wherein the first seat assembly component comprises a seat substrate; and
    wherein the second seat assembly component comprises a seat trim component.

14. An assembly comprising:
    a first structural component with a receptacle and a slot formed in the receptacle;
    a second component mounted to the first structural component, with a first aperture aligned with the receptacle; and
    a fastener comprising:
      a head sized to be received in the receptacle in the first structural component,
      a shank extending from the head and through the receptacle, with a first cylindrical portion sized to be received in the first aperture, and
      a retainer extending laterally from the shank and sized to be received within the slot to retain the shank from lengthwise translation relative to the first aperture;
    wherein the first structural component has an external surface;
    wherein the receptacle has an opening formed through the first structural component external surface;
    wherein the slot has an initial width adjacent the opening, and a narrower width spaced apart from the opening;
    wherein the slot has a blind depth to limit rotation of the fastener;
    wherein a detent is formed in the slot; and
    wherein the retainer comprises a projection sized to be received in the detent to orient the fastener at an installed orientation.

15. The assembly of claim 14 further comprising:
    a third component mounted to the first structural component, with a second aperture aligned with the receptacle and the first aperture; and wherein the shank further comprises a second cylindrical portion sized to be received in the second aperture.

16. The assembly of claim 14
wherein the opening formed through the first structural component external surface, faces a direction generally parallel to the shank; and
wherein the fastener head includes a contour sized to match the first structural component external surface.

\* \* \* \* \*